May 12, 1953 F. A. HESTER 2,638,550

VARIABLE FREQUENCY OSCILLATOR

Filed Aug. 10, 1946 2 Sheets-Sheet 1

FRANK A. HESTER
*INVENTOR.*

BY Alfred W. Barber
ATTORNEY

May 12, 1953 F. A. HESTER 2,638,550

VARIABLE FREQUENCY OSCILLATOR

Filed Aug. 10, 1946 2 Sheets-Sheet 2

FRANK A. HESTER
*INVENTOR.*

BY Alfred W. Barber
ATTORNEY

Patented May 12, 1953 2,638,550

UNITED STATES PATENT OFFICE 2,638,550

VARIABLE FREQUENCY OSCILLATOR

Frank A. Hester, New York, N. Y., assignor to Faximile, Inc., New York, N. Y., a corporation of Delaware Application August 10, 1946, Serial No. 689,792

1 Claim. (Cl. 250—36)

This invention pertains to a variable frequency oscillator, and more particularly to a vacuum tube oscillation generator, the frequency of oscillation of which may be varied in response to a signal source.

It is one of the objects of the invention to provide a vacuum tube oscillation generator, the frequency of which will vary in accordance with the variation of a source of signals.

Another object of the present invention is to provide an oscillator embodying aperiodic circuits which may be frequency modulated or readily frequency controlled by means of a control signal.

A further object of the invention is to provide a simple and efficient capacitance-resistance oscillator, the frequency of which will vary in accordance with certain changes of a source of signals impressed thereupon.

Another object is to provide a vacuum tube oscillation generator that is simple in construction and yet extremely efficient for use at very low frequencies.

A further object of the invention is to provide a simple yet efficient variable frequency oscillator operable at low frequencies so that a synchronizing pulse from a transmitter in a signaling system may be utilized to provide a signal source for controlling the frequency of a local oscillator at a point remote from the transmitter.

Other objects may be and may become apparent to one skilled in the art without departing from the spirit of the invention or the scope of the subjoined claim.

There are many applications in the radio and electronics arts for such an oscillator. One of these is in the field of facsimile communications. In certain types of facsimile communications, the facsimile signals obtained from a photo-electric cell, when a facsimile copy is scanned, may be applied in such a way as to control the frequency of oscillation of a sub-carrier oscillator in accordance with the facsimile signals. This may be done, for example, by causing the oscillator frequency to vary in such a way that when the original copy is black, the oscillator frequency is some low predetermined value and when the copy is white, the frequency of the oscillator is some high predetermined value. When the shades of gray vary between black and white, the frequency of oscillation will be between the two predetermined limits at a frequency determined by the optical density of the material being scanned. In this type of system, use of the present invention will provide a simpler, more efficient solution to the problem.

In another application in the field of facsimile, it is necessary to provide synchronization between the scanning spot at the transmitting end and the recording spot at the receiving end. In one method of doing this, the receiving scanning rate is controlled by the frequency of a local oscillator. The frequency of the local oscillator is controlled by a source of signals obtained from a synchronizing pulse transmitted at the transmitting end in accordance with the rate of scanning, and received at the receiving end in such a way as to provide a source of signals for adjusting the frequency of the local oscillator to such a value that the scanning at the transmitting end and the receiving end may be in synchronism. The use of the present invention in this type of synchronizing system provides a simple, reliable, inexpensive answer to the problem.

In describing the present invention, reference is made to the drawing accompanying and forming a part of this specification, and in which.

Figure 1:
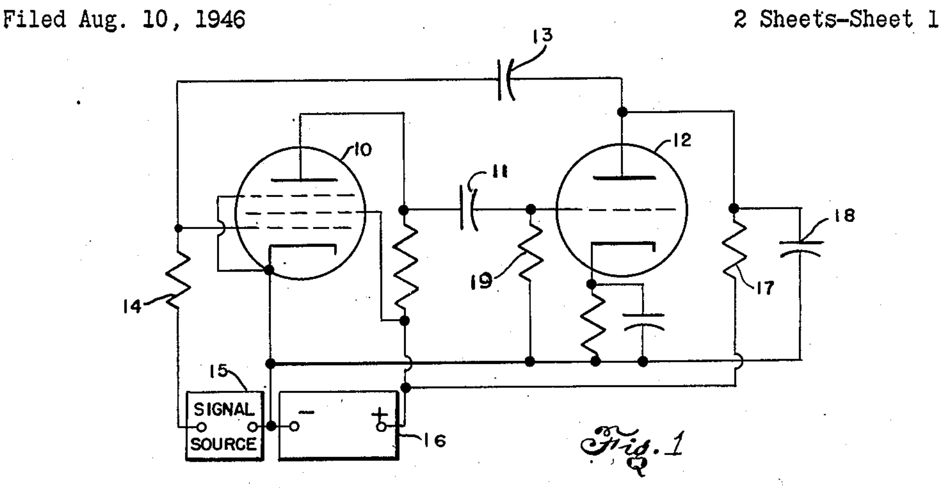
Fig. 1 is a circuit diagram of a preferred embodiment of this invention.

Referring to the drawings, and more particularly to Fig. 1, the two tubes 10 and 12 may be standard vacuum tubes, for example, 10 may be a 6SK7 and 12 may be a 6J5 type tube. The output 10 is connected to the input of 12 by any standard coupling means such as the B+ blocking capacitor 11 and the grid resistor 19 shown in the diagram. This coupling means provides substantially no phase shift between the output of amplifier tube 10 and the input of vacuum tube 12. The output of 12 is connected into a plate load resistor 17, a plate load or tank capacitor 18 and a phase shift feedback network 13—14 providing a substantial phase shift less than 90 degrees as will be described in connection with Fig. 3. The voltage developed across the resistor 14 is applied to the input of tube 10 thereby completing an oscillating circuit. Plate voltage for tubes 10 and 12 is supplied by voltage source 16.

The voltage amplification of the tube 10 may be varied in accordance with a signal source in any conventional manner, for example, as is shown in the diagram, by allowing the signal source 15 to control the bias applied to the control grid of 10. Plate potentials and heater potentials for the tubes in the circuit of Fig. 1 may be obtained in any conventional manner.

With proper choice of the constants in this circuit, the oscillator of Fig. 1 may be made to oscillate at predetermined frequencies varying in accordance with the gain of tube 10 which is varied in accordance with the signal source 15 in a manner to be described hereinafter.

Figure 2:
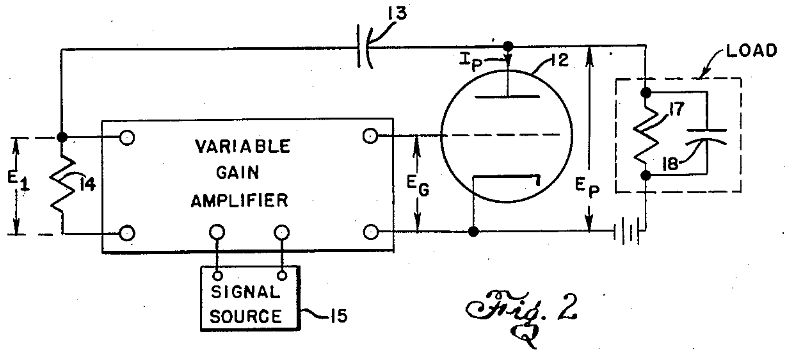
Fig. 2 is a simplified block diagram of the preferred embodiment of the invention which will be useful in clarifying the explanation of the principles of operation of the invention.

Referring to Fig. 2, which is a simplified block diagram of Fig. 1 for clarity, consider the instantaneous values of the voltages and currents, $E_p$, $E_G$, $E_1$, and $I_p$ at the points marked on the diagram.

Figure 3:
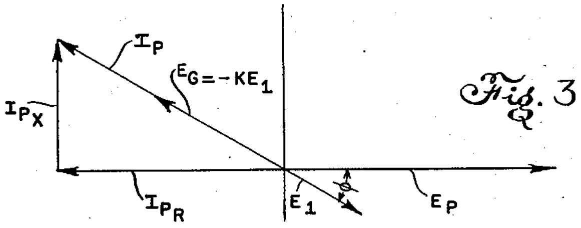
Fig. 3 is a vector diagram describing the relationship between certain currents and voltages at various points in the circuit of the present invention.

Referring to Fig. 3, in conjunction with Fig. 2, let the instantaneous value of $E_p$ be represented by the vector $E_P$ on the diagram. The instantaneous value of voltage $E_1$ will be determined from $E_P$ by the constants 13 and 14, which are represented in the diagram (Fig. 3) by the vector $E_1$. This may be shifted in phase from the vector $E_p$ through an angle $\theta$ determined by the reactance of 13 relative to the resistance of 14. It will also be reduced in amplitude by an amount determined by the same factors.

Let the instantaneous voltage amplification of the variable gain amplifier be represented by the factor K; then the output $E_G$ of the variable gain amplifier will be shifted in phase 180° from $E_1$ but at an amplitude K times as great as $E_1$. This is represented on the diagram of Fig. 3 as the vector $E_G$.

A component of the plate current $I_p$ of the tube 12 will be in phase with its input grid voltage $E_G$ and determined in magnitude by the magnitude of $E_G$. This may be represented by a vector in phase with $E_G$ and with an amplitude determined by the amplitude of $E_G$. This is represented on the diagram of Fig. 3 by the vector $I_p$. As is shown in the diagram of Fig. 3, the vector $I_p$ may be resolved into two components; one of which $I_{P_X}$, is in quadrature with the vector $E_p$, and the other $I_{P_R}$, in phase opposition to the vector $E_p$. Thus, when a voltage $E_P$ is impressed upon the plate of tube 12, the resulting plate current may be represented as the sum of two components, one in quadrature with $E_P$ and the other in phase opposition with $E_P$. The magnitudes of the resulting currents $I_{P_X}$ and $I_{P_R}$ are determined in part by the voltage amplification of the variable gain amplifier, their magnitudes varying directly with this factor.

Figure 4:
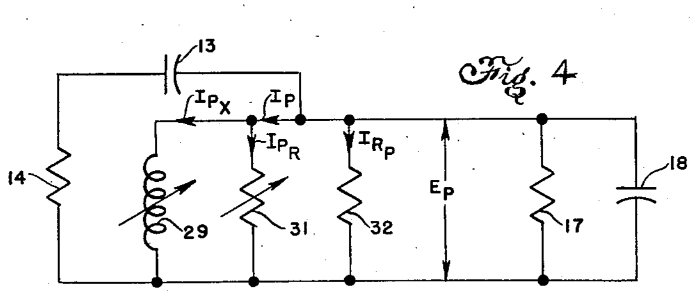
Fig. 4 is a still further simplified equivalent circuit diagram of the preferred embodiment of the present invention, which will be useful in describing its principles of operation.

Fig. 4 is a further simplification for the purpose of clarity, which is based upon the phase analysis of Fig. 3. The plate current component $I_{P_X}$ may be represented as that component of current that would be drawn by an inductance 29 having a voltage $E_p$ impressed across it, the magnitude of $I_{P_X}$ varying in accordance with variations in the voltage amplification K of the variable gain amplifier.

The value of inductance 29 in the diagram of Fig. 4 is determined by the magnitude of the current $I_{P_X}$ for a given magnitude of $E_p$. Hence, the value of inductance 29 varies with the voltage amplification K of the variable gain amplifier. Similarly, the component of plate current $I_{P_R}$ may be represented in Fig. 4 by the current that would be drawn by a negative resistance 31 when a voltage $E_P$ is applied across its terminals. The magnitude of $I_{P_R}$ is determined by the voltage amplification K of the variable gain amplifier, hence the value of negative resistance 31 also is determined by K.

The voltage $E_p$ is also applied in Fig. 4 as in Fig. 2 and in Fig. 1, to the resistor 17, the capacitor 18, and to the series combination 13—14 as well as the plate resistance 32 of tube 12. Fig. 4 then represents an equivalent circuit of the oscillator wherein the effect of the tubes 10 and 12 has been replaced by the equivalent effect of the inductance 29 and a negative resistance 31 connected across the circuit, the value of the inductance 29 and the value of the negative resistance being determined in part by the value of the voltage amplification K of the variable gain amplifier.

Figures 5, 6, 7, 8, 9:
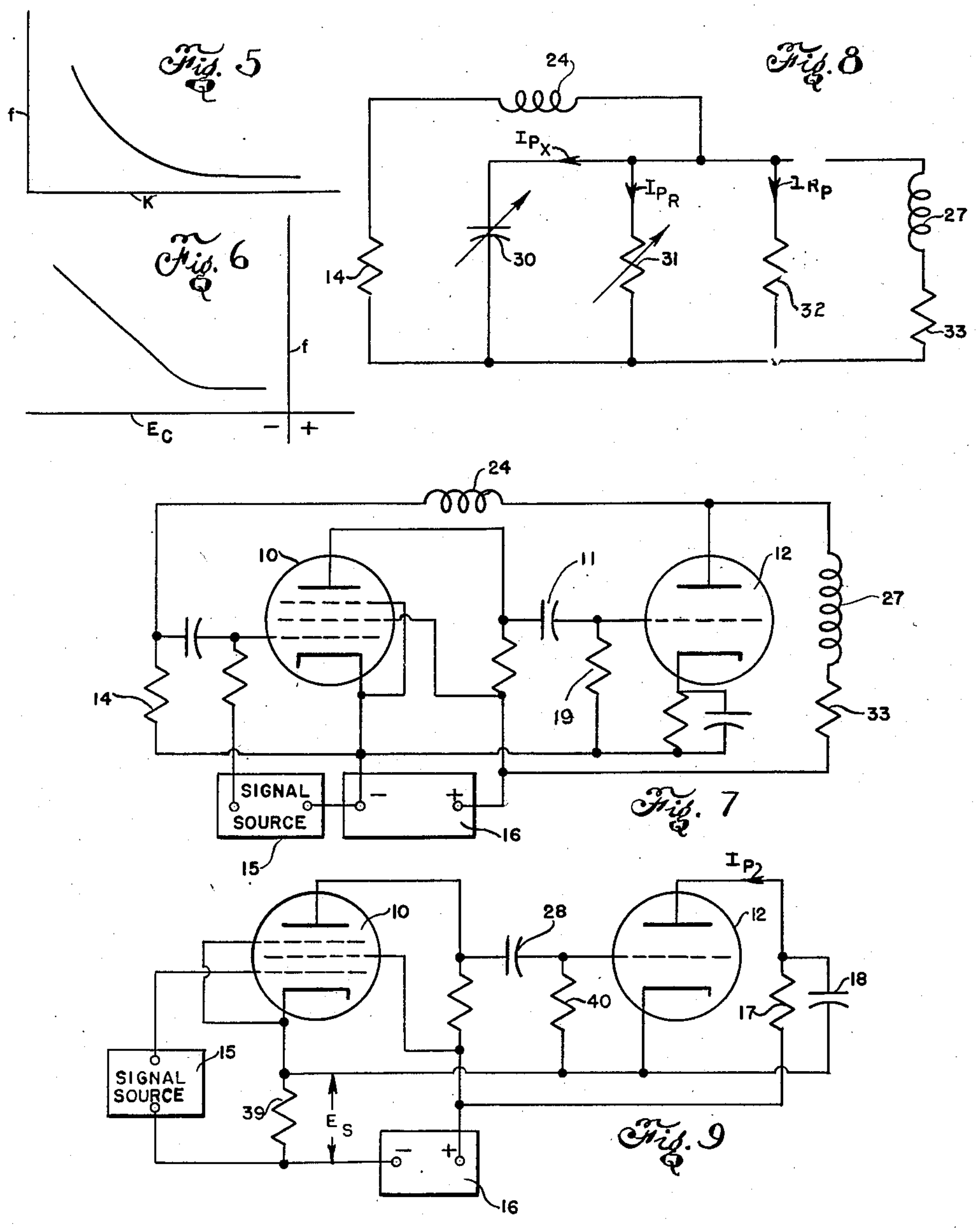
Fig. 5 is a plot of the frequency of oscillation of the oscillator against variations in gain of a typical oscillator.
Fig. 6 is a plot of frequency of oscillation against the control signal voltage applied to a typical oscillator.
Fig. 7 is a circuit diagram of another embodiment of the present invention.
Fig. 8 is a simplified equivalent circuit, somewhat similar to Fig. 4, but is directed to the modification shown in Fig. 7.
Fig. 9 is a circuit diagram of still a third embodiment of the present invention.

The equivalent circuit of Fig. 4 will have a natural frequency of oscillation determined by the values of its components. The circuit will produce sustained oscillations if the value of 31 is within a proper range of values, the proper range of values being determined in any particular instance by the losses introduced into the circuit by the positive resistors 17, 14, and 32. When negative resistor 31 is of such a value that it will exactly compensate or overcompensate the aforementioned losses, the circuit will produce sustained oscillations of a frequency determined by the components, including the value of the equivalent inductance 29 which is in turn determined in part by the variable amplification factor K of the variable gain amplifier. Since the voltage amplification factor K is in turn determined by the instantaneous value of the signal source, the equivalent inductance 29 in Fig. 4 is likewise determined by the instantaneous value of the signal source. Hence, the frequency of oscillation of the circuit is determined by the instantaneous value of the signal source. Figs. 5 and 6 illustrate these relationships.

In Fig. 5, a plot of frequency indicated by the symbol $f$ against the variable amplification factor K of the variable gain amplifier is depicted. For values of K sufficiently low, the circuit will not produce sustained oscillation. This may be visualized in reference to Fig. 4 by the fact that for sufficiently low values of K the value of the negative resistance 31 will not be proper for the maintenance of sustained oscillations. For sufficiently high values, the circuit will produce sustained oscillations varying with K in accordance with the curve shown in Fig. 5 for a typical oscillator.

Fig. 6 shows a plot of the negative grid voltage $E_c$ in relation to the frequency. It will be seen that as the negative grid voltage increases negatively, the frequency will increase. It will also be seen that the frequency may be controlled as a linear function of the grid voltages $E_c$ over a considerable range as shown by the linear portion of the curve.

The circuit shown in Fig. 7 is another embodiment of the present invention differing essentially from the circuit of Fig. 1 in that tank inductance 27 in series with resistance 33 is used to load tube 12 and the feed-back circuit consists of inductance 24 in series with resistance 14. With the proper choice of these components a result equivalent to the operation of the circuit of Fig. 1 may be obtained.

Fig. 8 shows an analysis of Fig. 7, which analysis results in an equivalent circuit similar to that of Fig. 4 but with the capacitor 13 (Fig. 4) replaced by the inductance 24 (Fig. 8), the resistor-capacitor combination 17 and 18, respectively, (Fig. 4) replaced by the series combination 33 and 27 (Fig. 8), and the equivalent inductance 29 (Fig. 4) replaced by an equivalent capacitance 30 (Fig. 8). Again, as in the circuit of Fig. 4, the frequency of oscillation of the circuit shown in Fig. 7 is dependent upon the voltage amplification of the tube 10, which is in turn dependent upon the instantaneous value of the signal from the signal source 15.

The circuit of Fig. 9 is a third embodiment of the present invention where the phase shift is produced by network 23 and 40 placed between the output of the tube 10 and the input of the tube 12 in conjunction with load 17 and 18. The plate current $I_P$ of the tube 12 flows through the cathode resistor 39, thereby producing a voltage drop $E_S$ which is in phase with the plate current $I_P$. This voltage drop $E_S$ is applied to the input of tube 10, thereby completing an oscillating circuit. An analysis similar to that of the analysis given for the circuit in Fig. 1 may be applied to the circuit of Fig. 7 with similar results.

What is claimed as new and desired to be secured by Letters Patent of the United States, is:

A variable frequency oscillation generator comprising a vacuum tube circuit having an input and an output, a reactive tank element connected across the output of said vacuum tube circuit, a variable gain amplifier having a 180-degree phase shift between its input and output, the amplifier being an essential integral component of the oscillation generator, circuit means coupling the output of the vacuum tube circuit to the input of the variable gain amplifier, circuit means coupling the output of the variable gain amplifier to the input of the vacuum tube circuit, one of said circuit means providing substantially no phase shift and the other providing a substantial phase shift less than 90 degrees, and means for varying the gain of said variable gain amplifier, whereby the frequency of the oscillation generator varies as a function of the gain of said integral amplifier.

FRANK A. HESTER.

References Cited in the file of this patent

UNITED STATES PATENTS

| Number | Name | Date |
|---|---|---|
| 2,321,269 | Artzt | June 8, 1943 |
| 2,331,317 | Germeshausen | Oct. 12, 1943 |
| 2,338,395 | Bartelink | Jan. 4, 1944 |
| 2,378,245 | Rath | June 12, 1945 |
| 2,422,424 | Landon | June 17, 1947 |
| 2,426,996 | Goodall | Sept. 9, 1947 |
| 2,444,084 | Artzt | June 29, 1948 |
| 2,447,816 | Rieber | Aug. 24, 1948 |
| 2,434,669 | Meacham | Jan. 20, 1948 |